May 20, 1958 W. E. TAYLOR 2,835,612
SEMICONDUCTOR PURIFICATION PROCESS
Filed Aug. 23, 1954
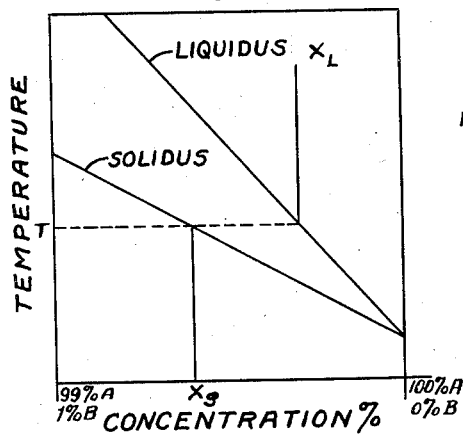
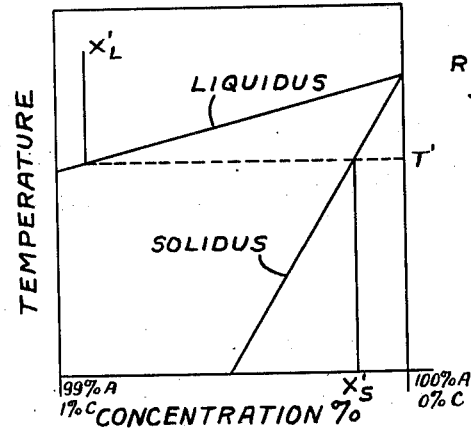
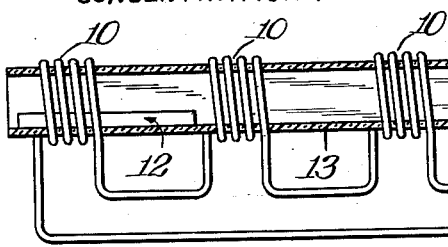
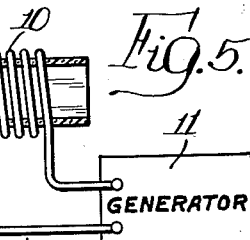
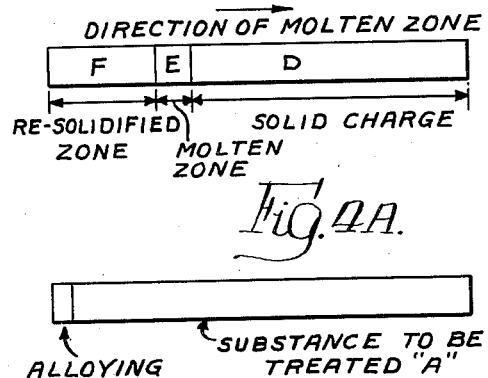
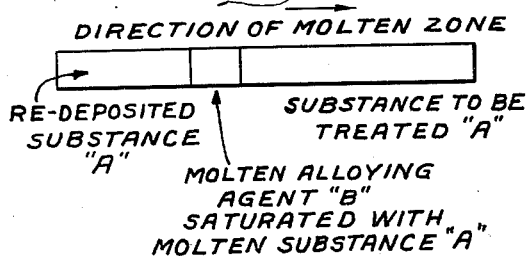
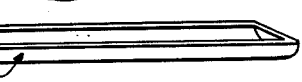
INVENTOR.
William E. Taylor,
BY
Mueller & Aichele
Attys.

United States Patent Office 2,835,612
Patented May 20, 1958

2,835,612

SEMICONDUCTOR PURIFICATION PROCESS

William E. Taylor, Phoenix, Ariz., assignor to Motorola, Inc., Chicago, Ill., a corporation of Illinois Application August 23, 1954, Serial No. 451,662

6 Claims. (Cl. 148—1.5)

The present invention relates generally to an improved process for changing the impurity content of a metal alloy or chemical compound, and it relates more particularly to an improved process of the zone melting type for purifying or otherwise altering the impurity concentration of a semiconductor or other substance.

In the fabrication of transistors, it is essential that the semiconductor used in the unit be as pure as possible at the start of the fabrication process. This is important since a semiconductor, for example, germanium, alloyed with small traces of certain elements exhibits electrical properties that depend upon the kind and concentration of the impurities. Impurities from the third column of the periodic table, for example, such as aluminum, gallium or indium impart p-type conductivity characteristics to the germanium; while impurities from the fifth column such as arsenic, Sb or bismuth impart n-type characteristics to the semiconductor. The use of relatively pure or intrinsic germanium at the start of the process allows the introduction of controlled amounts of desired impurities so that desired electrical characteristics can be obtained. One method of obtaining relatively pure germanium is known as the zone melting process.

Purification of metal alloys or the like by the zone melting process consists of melting a localized region of an elongated charge or ingot of the substance to be purified and passing the molten region through the charge. As the molten region or zone passes through the charge it accumulates a large percentage of the impurities in the charge, and these are swept through to the end of the charge. By passing a number of successive molten zones through the charge, a high degree of purification may be achieved.

The determining factor as to whether any particular impurity will accumulate in the molten zone or in the solid portion of the charge is termed the "distribution coefficient" of that particular impurity. This coefficient is defined as the ratio between the concentration of the impurity in the solid portion of the charge and the concentration in the molten or liquid zone at equilibrium. If the distribution coefficient is less than unity, the impurities will tend to segregate in the liquid and be swept by the molten zone out of the ingot, thereby resulting in purification of the ingot. On the other hand, if the distribution coefficient is greater than unity, the impurity will segregate in the solid and the molten zone will tend to be purified.

It is an object of the present invention to provide an improved process of the zone melting type described above which exhibits increased purification efficiency as compared with prior art processes of this general type.

A general object of the invention is to provide an improved process for altering the impurity concentration in a charge or ingot of a metal alloy or chemical compound.

A further object of the invention is to provide an improved process for purifying a semiconductor so as to reduce to extremely low values the concentrations of certain impurities in the semiconductor.

Another object of the invention is to provide such an improved process which faciltates the purification of semiconductor bodies of relatively high melting points, such as silicon.

Yet another object of the invention is to provide such an improved process that may be adapted to the formation of p-n junctions within a semiconductor.

A still further object of the invention is to provide such an improved process which facilitates the growth of crystals of semiconductor materials having relatively high melting points.

A feature of the process of the invention is the introduction of an alloying agent into a molten zone that is swept across a charge of the substance to be purified, which alloying agent alters the distribution coefficients of the impurities in the charge so as to increase the tendency of such impurities to be swept either into or out of the molten zone with resulting increased purification of the resolidified portion of the charge trailing the molten zone or in the molten zone.

Another feature of the process of the invention is the introduction of an alloying agent into the moving molten zone that has characteristics of lowering the melting point of the charge as it alloys therewith so that purification of the charge can be carried out at a lower temperature than the melting point thereof.

The above and other features of the invention which are believed to be new are set forth with particularity in the appended claims. The invention itself, however, together with further objects and advantages thereof, may best be understood by reference to the following description when taken in conjunction with the accompanying drawing in which:

Figs. 1 and 2 are phase diagrams useful in understanding the underlying principles of the present invention;

Fig. 3 is a schematic representation of the zone melting process principle upon which the invention is based;

Figs. 4a and 4b are schematic representations of the process of the invention; and Figs. 5 and 6 show apparatus suitable for carrying out the invention.

The invention provides an improved method of treating a substance to alter the concentration of certain impurities within the substance, which substance and impurities are capable of existing together in an equilibrium liquid and solid state throughout a range of temperatures with the impurities having various concentration ratios between the liquid and solid regions, such method including the steps of:

(1) Providing an elongated charge or ingot of the substance to be treated, (2) Placing adjacent the charge and in contact therewith, a charge of a selected alloying agent which has the property of altering the concentration ratios of at least some of the impurities mentioned above.

(3) Heating the charge of the alloying agent to a molten state to provide a heat zone for the substance to be treated, and (4) Causing the heat zone of the alloying agent to sweep across the charge of the substance to be treated to provide a moving liquid zone into the leading edge of which the substance to be treated is dissolved and from the trailing edge of which is deposited the substance having different concentrations of at least some of the impurities therein as compared with the original charge of the substance.

Figs. 1–3 are useful in understanding the general zone melting purification process on which the process of the present invention is predicated. During the ensuing discussion, the purification of germanium will be referred to because the process of the invention finds great utility in such purification. However, this is not intended to be a limiting factor as the process can be applied to the treatment of a wide range of substances such as metal alloys and chemical compounds. It is only necessary that the substance to be treated may be raised to a molten state, and the substance and the impurities therein may be capable of existing together in an equilibrium liquid and solid state.

The phase diagram of Fig. 1 indicates the characteristic of a substance A having a trace of an impurity B therein, with the substance and the impurity existing together in an equilibrium liquid and solid state. In this phase diagram, the substance A in its pure state is assumed to have a lower melting point than the impurity B. When the substance A containing a small concentration of impurity B is melted, the concentration of the impurity in the liquid substance is represented by the vertical line $X_L$. If the substance is allowed to cool the line $X_L$ meets the liquidus curve at temperature T and the solid begins to freeze out of the liquid with the impurity concentration in the solid being $X_S$ (given by the solidus curve), the concentration $X_S$ of the impurity being higher than the concentration $X_L$. Impurities such as represented by the phase diagram of Fig. 1, and which have a higher melting point than the substance to be treated, are said to have a distribution coefficient of greater than unity. This follows because the impurity concentration in the solid is greater than the concentration in the liquid.

In the phase diagram of Fig. 2, the substance A in its pure state is assumed to have a higher melting point than an impurity C. When substance A containing a small concentration of impurity C is melted, the concentration of the impurity in the liquid is represented by the vertical line $X'_L$. After the substance is allowed to cool the line $X'_L$ meets the liquidus curve at temperature T' and the solid begins to freeze out of the liquid with the impurity concentration in the solid being $X'_S$ (given by the solidus curve), the impurity concentration $X'_S$ in the solid being lower than the concentration $X'_L$ in the liquid. Impurities such as that represented by the phase diagram of Fig. 2, and which have a lower melting point than the substance to be treated are said to have a distribution coefficient of less than unity. This obtains because the impurity concentration in the solid is less than the concentration in the liquid.

In the zone melting technique, as shown in Fig. 3, an elongated charge or ingot D of the substance to be treated is provided, and a narrow zone E of the charge is heated to a molten state and is swept across the charge leaving a resolidified zone F at its trailing edge. The alloying impurities in charge D having a higher melting point than the substance to be treated and, therefore, having a distribution coefficient that is greater than unity, such as represented by the phase diagram of Fig. 1, tend to concentrate in the solid zone F rather than in the molten zone E. Therefore, the molten zone tends to become purified insofar as these particular impurities are concerned. However, the alloying impurities in charge D having melting points lower than the substance to be treated in its pure state and, therefore, having distribution coefficients that are less than unity, such as represented by the phase diagram of Fig. 2, tend to concentrate in the molten zone E and are swept by the molten zone to the end of the ingot. These latter impurities are removed from the resolidification zone F so that this zone is purified insofar as these impurities are concerned. It has been found that the major portion of the impurities normally found in germanium have distribution coefficients of less than unity, and these impurities are therefore swept out of the resolidified zone F by the molten zone E. The only two impurities that occur with any significant concentrations and which have distribution coefficients greater than unity, are silicon and boron. Other alloying impurities such as phosphorus, arsenic, antimony, bismuth, tin, aluminum, gallium, indium, silver and gold have distribution coefficients that are less than unity. It is clear that the efficiency of the purification process is higher for impurities having the lower distribution coefficient. In accordance with the present invention, an alloying agent is added to the system to decrease the distribution coefficients of the alloying impurities and therefore to increase the purifying efficiency of the system insofar as impurities in the resolidified zone are concerned. It is also within the concept of the present invention that an alloying agent be added to the molten zone that increases the distribution coefficients so as to increase the purification of the molten zone. The latter expedient does not appear to be as practical as the former since it is usually more desirable that the resolidified zone be purified rather than the molten zone.

For this reason, the following description is based on the embodiment of the process in which the purification efficiency is increased insofar as the resolidified zone is concerned.

The alloying agent itself must have a relatively low distribution coefficient and melting point as compared with the substance itself and the various impurities therein, when it is desired to increase the purification efficiency of the resolidified zone. The alloying agent alloys with the substance to be treated and with the impurities therein to form alloys therewith thereby lowering the melting points as compared with the melting points of the substance and impurities themselves. The alloying agent correspondingly lowers the distribution coefficients, thereby increasing the purifying efficiency of the resolidified zone. Any of the impurities listed above as having distribution coefficients of less than unity can be used for the alloying agent. However, for maximum efficiency, it is preferred that the alloying agent have a relatively low distribution coefficient and it has been found that tin, lead, indium, silver and gold are suitable as alloying agents. A factor to be considered is that the use of an alloying agent may increase the concentration of the agent in the purified ingot, and it is preferable to choose one that will have little effect on the electrical properties of the ingot in situations where the ingot is to be used for semiconductor purposes. Therefore, in the case of germanium, it is preferable to use tin or lead which have been found to have little effect on the electrical properties of the semiconductor and which also have the desirable characteristics of relatively low distribution coefficients for minimum resulting concentration in the resolidified zone.

The schematic representation of the improved process of the invention is shown in Figs. 4a and 4b. In Fig. 4a, the alloying agent "B" is placed adjacent an elongated charge or ingot of the substance "A" which is to be treated. By the application of heat to the narrow zone containing the alloying agent, this agent is melted and raised to a temperature at which it rapidly dissolves substance "A." The alloying agent "B" can be initially saturated with the substance "A" or sufficient time can be allowed after the zone melting to allow saturation to occur.

The heat zone formed by the molten saturated alloying agent "B" is then moved slowly along the ingot "A," as shown in Fig. 4b. The substance "A" is dissolved into the leading edge of the heat zone and, as a consequence of the principle of phase equilibrium discussed previously herein, the purified substance "A" is redeposited from the trailing edge of the heat zone.

The accomplishment of the result discussed in the preceding paragraph requires a temperature gradient between the leading and trailing edges of the molten zone and this gradient is usually provided by the thermal lag as the molten zone is moved across the ingot.

Apparatus suitable for carrying out the process of the invention is shown in Figs. 5 and 6. The zone heating is accomplished by a plurality of spaced inductance coils 10 which are connected in series and which are powered by a generator 11. The generator, for example, may be of a type capable of delivering 12½ kilowatts. The elongated ingot or charge "A" and the alloying agent "B" are contained in a graphite boat or crucible 12 which, for example, has a length of 13.5". The coils are wound on a tube 13 of glass or other suitable heat resistant insulating substance, and the boat is drawn through the tube from left to right. Each coil 10 provides a heat zone and in the illustrated embodiment, five successive passes are made in one operation. The tube 13 is preferably filled with an inert gas, such as argon, to prevent oxidation. The boat or crucible 12 is provided with a gate 12A that is placed approximately 1/10 of the boat length from the rear of the boat. This gate acts as a dam so that the molten substance "A" containing the impurities at the end of each pass flows through one of the coils 10, spills over to the section at the back of the boat. With this arrangement, the impurities cannot remain within the substance "A" when passing through successive ones of coils 10.

After the treatment, the ingot is removed from the boat 12. The purity of the ingot varies along its length with the purest portion being near the front end of the ingot as it was drawn through tube 13. The resistivity of the ingot is a measure of its purity, and by passing a constant current through the ingot and by the use of probes of fixed separation and apparatus for measuring the voltage drop between the probes, the ingot can be cut in sections of various grades of purity.

The present invention finds great utility in the processing and purification of materials having relatively high melting points such as silicon. The addition of the alloying agent enables the heat zone to have a relatively low temperature as compared with the melting point of the substance to be treated due to the depressing effect of the alloying agent on the melting point of that substance. Thus, in the process of the invention, materials such as silicon can be treated with lower capacity heating equipment and cheaper and more common crucible materials. Tin or lead have been found suitable for the alloying agent for the treatment of silicon.

The process also finds application in the growth of crystals from melts of crystal material, particularly in the cases where phase changes at higher temperatures render crystal growth infeasible. By the addition of a suitable alloying agent to the melt, the crystal growth can be carried out at a relatively low temperature.

Another application of the process of the invention is in the formation of p-n junctions in a semiconductor. To achieve this, a solid semiconductor having an impurity of one conductivity type is brought into contact with a molten zone in which the alloying agent imparts the opposite conductivity type to the semiconductor in the alloying zone. The resulting diffusion of the molten semiconductor into the solid zone produces a p-n junction in the solid zone. By terminating the process after a selected diffusion has occured, and allowing the molten zone to solidify, a semiconductor is obtained having a p-n junction formed therein.

It is clear, therefore, that although certain embodiments of the invention have been shown and described, modifications may be made. It is intended in the appended claims to cover all such modifications as fall within the true spirit and scope of the invention.

I claim:

1. A method of treating a substance to alter the concentrations of certain alloying impurities contained therein, which substance has a certain melting point and which impurities have melting points different from said substance and different from one another, which method includes the step of providing a solid charge of the substance to be treated, providing a liquid region of the substance in contact with said solid charge, with the substance and the alloying impurities existing in an equilibrium state between the liquid and the solid regions and with the impurities having different concentration ratios between said liquid and solid regions, providing a selected alloying agent which has the property of alloying with said impurities to alter the melting points thereof, introducing said alloying agent into said liquid region in sufficient quantity to alloy with said impurities and thereby alter their melting points, and causing said liquid region to sweep across the charge of the substance to be treated so that the substance is dissolved into the leading edge of the liquid region and is deposited from the trailing edge thereof with different concentrations of said impurities as compared with the original charge of the substance.

2. A method of purifying a crystal of semiconductor material from a group consisting of germanium and silicon to alter the concentrations of certain alloying impurities contained therein from a group consisting of antimony, bismuth, tin, aluminum, gallium, indium, silver and gold, so as to obtain a crystal of essentially intrinsic semiconductor material, which crystal has a certain melting point and which impurities have melting points different from said crystal and different from one another, which method includes the steps of providing an elongated solid ingot of the crystal to be purified, providing a liquid region of the crystal in contact with said ingot adjacent one end thereof, with the crystal and the alloying impurities existing in an equilibrium state between the liquid and the solid regions and with the impurities having different concentration ratios between said liquid and solid regions, providing a selected alloying agent having no material effect on the electrical properties of the crystal and which has the property of alloying with said impurities to alter the melting points thereof, introducing said alloying agent into said liquid region in sufficient quantity to alloy with said impurities and thereby alter their melting points, and causing said liquid region to sweep across said ingot so that the crystal is dissolved into the leading edge of the liquid region and is deposited from the trailing edge thereof with different concentrations of said impurities as compared with the original ingot.

3. A method of purifying a germanium crystal to lower the concentrations of certain alloying impurities contained therein from a group consisting of antimony, bismuth, tin, aluminum, gallium, indium, silver and gold, so as to obtain a crystal of essentially intrinsic germanium, which crystal has a certain melting point and which impurities have melting points different from said crystal and different from one another, which method includes the steps of providing an elongated solid ingot of the germanium crystal to be purified, providing a liquid region of the germanium in contact with said ingot adjacent one end thereof, with the germanium and the alloying impurities existing in an equilibrium state between the liquid and the solid regions and with the impurities having different concentration ratios between said liquid and solid regions, providing an alloying agent from a group consisting of tin and lead and which has the property of alloying with the germanium and said impurities to lower the melting points thereof, introducing said alloying agent into said liquid region in sufficient quantity to alloy with said impurties and thereby alter their melting points, and causing said liquid region to sweep across said ingot so that the germanium is dissolved into the leading edge of the liquid region and is deposited from the trailing edge thereof with lower concentrations of said impurities as compared with the original ingot.

4. A method of treating a crystal of semiconductor material from a group consisting of silicon and germanium to reduce the concentration of certain alloying impurities contained therein from a group consisting of antimony, bismuth, tin, aluminum, gallium, indium, silver and gold, which crystal and impurities are capable of existing together in an equilibrium liquid and solid state throughout a range of temperatures with the impurities having various concentration ratios between the liquid and solid regions, which method includes the steps of providing an elongated ingot of the semiconductor material, placing adjacent one end of said ingot and in contact therewith a charge of a selected alloying agent from a group consisting of tin, lead, indium, silver and gold, which has the property of alloying with said crystal and said impurities to increase said concentration ratios, heating said charge of said alloying agent to a molten state to provide a liquid zone, and causing said liquid zone to sweep across said ingot from said one end thereof to the other so that the crystal is dissolved into the leading edge of the liquid zone and the crystal is deposited from the trailing edge of the liquid zone with lower concentrations of said impurities as compared with the original ingot.

5. A method of treating a germanium crystal which contains a metallic alloying impurity selected from the group consisting of antimony, bismuth, aluminum, gallium, indium, gold, and silver to reduce the concentration of said impurity in said germanium crystal, which method includes the steps of providing an elongated ingot of crystalline germanium containing said impurity, placing adjacent one end of said ingot and in contact therewith a charge of metallic tin, heating said charge to a molten state to provide a liquid zone, and causing said liquid zone to sweep across said ingot from one end thereof to the other so that germanium is dissolved into the lead-leading edge of the liquid zone and germanium is deposited from the trailing edge of the liquid zone having a lower concentration of said impurity as compared with the original ingot.

6. A method of treating crystalline germanium which contains a metallic alloying impurity selected from the group consisting of antimony, bismuth, tin, aluminum, gallium, indium, gold and silver to reduce the concentration of said impurity in said germanium which method includes the steps of providing an elongated ingot of crystalline germanium containing said impurity, placing adjacent one end of said ingot and in contact therewith a charge of metallic lead, heating said charge to a molten state to provide a liquid zone, and causing said liquid zone to sweep across said ingot from said one end thereof to the other so that germanium is dissolved into the leading edge of the liquid zone and germanium is deposited from the trailing edge of the liquid zone having a lower concentration of said impurity as compared with the original ingot.

References Cited in the file of this patent

UNITED STATES PATENTS 2,747,971    Hein                  May 29, 1956

FOREIGN PATENTS 1,065,523    France               Jan. 13, 1954